United States Patent
Nakayama et al.

(10) Patent No.: US 9,394,816 B2
(45) Date of Patent: Jul. 19, 2016

(54) PARTICULATE FILTER

(75) Inventors: Shigeki Nakayama, Gotenba (JP); Hiromasa Nishioka, Susono (JP); Daichi Imai, Sunto-gun (JP); Hiroshi Otsuki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/388,315

(22) PCT Filed: Mar. 30, 2012

(86) PCT No.: PCT/JP2012/058620
§ 371 (c)(1),
(2), (4) Date: Sep. 26, 2014

(87) PCT Pub. No.: WO2013/145266
PCT Pub. Date: Oct. 3, 2013

(65) Prior Publication Data
US 2015/0059321 A1    Mar. 5, 2015

(51) Int. Cl.
*F01N 3/022* (2006.01)
*F01N 3/035* (2006.01)
*B01D 46/24* (2006.01)
*F01N 3/023* (2006.01)
*F01N 3/10* (2006.01)

(52) U.S. Cl.
CPC ............ *F01N 3/035* (2013.01); *B01D 46/2429* (2013.01); *F01N 3/022* (2013.01); *F01N 3/0222* (2013.01); *F01N 3/0232* (2013.01); *B01D 2046/2437* (2013.01); *F01N 3/103* (2013.01); *F01N 2330/06* (2013.01); *F01N 2330/60* (2013.01); *F01N 2510/0682* (2013.01)

(58) Field of Classification Search
CPC .................. B01D 46/2474; B01D 2046/2433; B01D 2046/2437; B01D 2275/307; F01N 2330/60; F01N 2510/0682
See application file for complete search history.

(56) References Cited

U.S. PATENT DOCUMENTS

| | | | |
|---|---|---|---|
| 6,361,579 B1 | 3/2002 | Itoh et al. | |
| 2004/0068971 A1 | 4/2004 | Kuki et al. | |
| 2008/0241011 A1 | 10/2008 | Ohno et al. | |
| 2012/0070346 A1* | 3/2012 | Mizutani | B01D 46/2474 422/178 |

FOREIGN PATENT DOCUMENTS

| | | |
|---|---|---|
| EP | 2168662 A1 | 3/2010 |
| JP | 2001-012229 A | 1/2001 |
| JP | 2004-130229 A | 4/2004 |

(Continued)

OTHER PUBLICATIONS

Machine tranlslation of JP 2010227743 A, accessed on Sep. 16, 2015.*

*Primary Examiner* — Kenneth Bomberg
*Assistant Examiner* — Jonathan Matthias
(74) *Attorney, Agent, or Firm* — Kenyon & Kenyon LLP (57) ABSTRACT

An object of the invention is to suppress deposition of ash in a wall-flow particulate filter while curtailing drops in a trapping rate of PM. To attain the above object, the invention provides a wall-flow particulate filter delimited by porous partition walls having pores of a size that allows ash and ash aggregates to pass therethrough. In the filter, a coat layer having pores smaller than the pores of the partition walls is provided, at a region of the partition walls, from an upstream end thereof up to a position before a downstream end thereof.

5 Claims, 11 Drawing Sheets

(56) References Cited

FOREIGN PATENT DOCUMENTS

| JP | 2004-239199 A | 8/2004 |
| JP | 2004251245 A | 9/2004 |
| JP | 2005-305417 A | 11/2005 |
| JP | 2008215337 A | 9/2008 |
| JP | 2010-082615 A | 4/2010 |
| JP | 2010227743 A * | 10/2010 |
| JP | WO 2011125766 A1 * | 10/2011 ......... B01D 46/2474 |
| WO | 2008/126331 A1 | 10/2008 |

* cited by examiner

PARTICULATE FILTER

CROSS-REFERENCE TO RELATED APPLICATIONS

This is a national phase application based on the PCT International Patent Application No. PCT/JP2012/058620 filed Mar. 30, 2012, the entire contents of which are incorporated herein by reference.

TECHNICAL FIELD

The invention relates to a particulate filter that is disposed in an exhaust gas passage of an internal combustion engine.

BACKGROUND ART

Conventional particulate filters for trapping particulate matter (PM) that is present in exhaust gas of an internal combustion engine include wall-flow particulate filters wherein first passages, the upstream end of which is blocked by plugs, and second passages, the downstream end of which is blocked by plugs, are disposed alternately, and wherein porous partition walls are disposed between the first passages and the second passages.

Wall-flow particulate filters that have been proposed include wall-flow particulate filters provided with through-holes in plug portions of the second passages (see, for instance, Patent literature 1). Other wall-flow particulate filters that have been proposed include wall-flow particulate filters that support a metal of lower electronegativity than that of calcium (Ca) (see, for instance, Patent literature 2). Further instances of proposed wall-flow particulate filters include filters in which a catalyst support layer is formed in part of the upstream side of the wall faces of passages (see, for instance, Patent literature 3).

Patent literature 1: Japanese Patent Application Publication No. 2004-130229 (JP 2004-130229 A)

Patent literature 2: Japanese Patent Application Publication No. 2001-12229 (JP 2001-12229 A)

Patent literature 3: International Patent Application No. 2008/126331 (WO 2008/126331)

SUMMARY OF THE INVENTION

Components derived from, for instance, fuel additives and lubricants (engine oil) in the exhaust gas that flows into the particulate filter may bond to the particulate filter or the combustion chambers of the internal combustion engine, and give rise to compounds that are referred to as ash. For instance, ash is herein a compound such as calcium sulfate ($CaSO_4$) or calcium phosphate ($Ca_3(PO_4)_2$), or magnesium sulfate ($MgSO_4$). This ash becomes trapped in the particulate filter in the same way as the PM, but is not removed from the particulate filter even when the PM is subjected to an oxidative removal process. Accordingly, ash aggregates become deposited on the particulate filter, which may lead to clogging of the pores of the partition walls.

Conceivable methods for addressing this issue may involve, for instance, increasing the pore size of the partition walls, or providing through-holes in plug portions of the second passages, as disclosed in Patent literature 1. However, the above approach may lead to a situation where PM having a particle size comparable to or smaller than that of ash and ash aggregates slips through the particulate filter together with ash.

In the light of the above, it is an object of the invention to provide a technology that allows suppressing deposition of ash in a wall-flow particulate filter while curtailing drops in the trapping rate of PM.

In order to solve the above problems, the invention is a wall-flow particulate filter having a plurality of passages delimited by porous partition walls that have pores of a size that allows ash and ash aggregates to pass therethrough, such that a coat layer having pores smaller than the pores of the partition walls is provided, at a region of the partition walls, from an upstream end thereof up to the front of a downstream end thereof.

In further detail, the particulate filter according to the invention is configured to have a plurality of first passages ends of which, on an upstream side in a flow direction of exhaust gas, are blocked;

a plurality of second passages ends of which, on a downstream side in the flow direction of exhaust gas, are blocked;

porous partition walls, which are members separating the first passages from the second passages, and which have pores of a size that allows ash to pass therethrough; and a porous coat layer, which is provided on part of a region of the partition walls, from an upstream end thereof up to a position before a downstream end thereof, and which has pores smaller than the pores of the partition walls.

As a result of diligent experimentation and verification, the inventors of the application found that ash and ash aggregates (referred to hereafter collectively as "ash") are generated or deposited readily at the vicinity of the downstream ends of the second passages of the wall-flow particulate filter. The inventors of the application found also that PM passes readily through the partition walls upstream of the sites, in the second passages, at which ash is readily generated or deposited.

The particulate filter of the invention, therefore, is configured to have a coat layer having pores, smaller than those of the partition walls, at part of a region of the partition walls, from the upstream end thereof up to a position before the downstream end. Preferably, the coat layer is provided at least at the partition walls that enclose the second passages, from among the partition walls that enclose the first passages and the partition walls that enclose the second passages.

In the particulate filter having such a configuration, the greater part of the PM is trapped in the pores of the coat layer, while the greater part of the ash passes through the pores of the partition walls on which the coat layer is not provided. As a result, it becomes possible to suppress deposition of ash while curtailing drops in the trapping rate of PM.

The coat layer may be a dispersion in which particles are dispersed substantially homogeneously. In this case, a large number of gaps (pores) is formed between particles, and hence yet more PM can be trapped in the coat layer. As a result, the amount of PM that reaches the region in the vicinity of the downstream end of the partition walls (i.e. the region of partition walls on which the coat layer is not provided) is further reduced. It becomes accordingly possible to keep small the amount of PM that slips through the pores of the partition walls.

The particulate filter of the invention may be configured such that a metal having oxidizing ability (for instance, a metal of the platinum (Pt) group) is provided at the region in the vicinity of the downstream end of the partition walls i.e. the region of the partition walls on which the coat layer is not provided.

As described above, the greater part of the PM is trapped in the pores of the coat layer at a region of the partition walls, from the upstream end up to the front of the downstream end (region of the partition walls on which the coat layer is provided). However, the remaining small amount of PM may in some instances reach the vicinity of the downstream end of the partition walls. In this case, a small amount of PM may slip through the pores of the partition walls and flow out of the particulate filter.

When, by contrast, a metal having oxidizing ability is supported at the region of the partition walls in the vicinity of the downstream end, i.e. at the region of the partition walls on which the coat layer is not provided, the PM that reaches the vicinity of the downstream end of the partition walls is oxidized. As a result, it becomes possible to keep small the amount of PM that slips through the particulate filter.

Next, the coat layer of the invention may be configured to have a metal, the ionization tendency of which, is greater than that of a main component of the ash. As described above, ash is generated readily at the partition walls in the vicinity of the downstream ends of the second passages, i.e. at portions of the partition walls on which the coat layer is not provided. However, a small amount of ash may be generated or become deposited at the partition walls in the vicinity of the upstream ends of the second passages, i.e. at the portions of the partition walls on which the coat layer is provided. Accordingly, the pores of the coat layer may be clogged by ash when the particulate filter is used over long periods of time.

When the coat layer has a metal, the ionization tendency of which, is greater than that of the main component of the ash, by contrast, other components in the exhaust gas are adsorbed to or taken up into the coat layer in preference to that main component. As a result, the main component of the ash does not bond readily to other components in the exhaust gas at the surface of the coat layer. That is, generation and deposition of ash at the surface of the coat layer are suppressed.

Herein, for instance, Ca is the main component of the ash. In this case, the coat layer may be configured to have a metal such as potassium (K) or barium (Ba), the ionization tendency of which, is greater than that of Ca. Sulfur (S), phosphorus (P) or the like in exhaust gas becomes adsorbed to the coat layer in preference to Ca, in a case where the coat layer has K or Ba. As a result, ash such as $CaSO_4$ or $Ca_3(PO_4)_2$ is not generated readily at the surface of the coat layer.

The partition walls of the invention may be formed in such a manner that the average pore size of the pores thereof ranges from 25 μm to 50 μm. The coat layer may be a dispersion of particles (powder) having an average particle size ranging from 1 hum to 10 μm.

Findings by the inventors of the application have revealed that ash and ash aggregates can slip through the pores of the partition walls when the average pore size of the partition walls is about 25 μm or greater. In other words, ash and ash aggregates may slip through the pores of the partition walls when the average pore size of the partition walls is about 250 or more times the particle size of ash. However, the strength of the base material that makes up the partition walls may decrease when the average pore size is greater than 50 μm. Therefore, it becomes possible to suppress deposition of ash, while curtailing drops in the strength of the base material, when the partition walls are formed in such a manner that the average pore size thereof ranges from 25 μm to 50 μm.

Findings by the inventors of the application have shown that gaps of a size appropriate to PM trapping are formed between the particles when the average particle size of the particles that form the coat layer is equal to or greater than 1 μm. Herein, pressure loss in the particulate filter increases sharply when the average particle size of the particles exceeds 10 μm. Therefore, yet more PM can be trapped, while curtailing increases in pressure loss, when the coat layer is made up of dispersion of particles having an average particle size ranging from 1 μm to 10 μm. The term "average particle size" denotes herein not the average particle size of the particles (primary particles) that are used to produce the dispersion, but the average particle size of particles (secondary particles) at the time where the dispersion is stable (is complete).

The method for forming the coat layer (dispersion) at the surface of the partition walls is not particularly limited. As an example, a method can be resorted to that involves coating the surface of the partition walls with a slurry having primary particles, followed by drying and firing. In such a method, the pore size of the coat layer (dispersion) can be adjusted on the basis of the particle size of the primary particles in the slurry. In other words, the particle size of the secondary particles that make up the dispersion can be adjusted on the basis of the particle size of the primary particles in the slurry. Accordingly, the average pore size of the coat layer can be brought to a desired size (i.e. a size suitable for PM trapping) by establishing the particle size of primary particles in such a manner that the average particle size of the secondary particles ranges from 1 μm to 10 μm.

The particle size of the primary particles is smaller than the particle size of the secondary particles, and the particle size of the secondary particles is smaller than the pore size of the partition walls. As a result, the primary particles may in some instances intrude into the pores of the partition walls when the partition walls are coated with the slurry. The coat layer may therefore be formed in accordance with a method that involves applying the slurry after the pores of the partition walls have been filled with a substance that can be burned off, a method that involves hydrophobizing the partition walls, and using a liquid that has water or a water-soluble organic matter as a medium liquid of the slurry, or a method that involves causing a volatile solvent to be held in the pores of the partition walls, and applying thereafter the slurry having the volatile solvent as a main dispersion medium.

The invention allows suppressing deposition of ash in a wall-flow particulate filter while curtailing drops in the trapping rate of PM.

MODES FOR CARRYING OUT THE INVENTION

Specific embodiments of the invention will be explained next on the basis of accompanying drawings. Unless otherwise stated, the dimensions, materials, shapes of constituent parts and relative arrangement of the constituent parts, and other features described in the following embodiments, are not meant in any way to limit the technical scope of the invention to these features alone.

Working Example 1

A first working example of the invention will be explained first on the basis of FIG. 1 to FIG. 6. Herein, FIG. 1 is a longitudinal cross-sectional diagram of a particulate filter in which the invention is used, and FIG. 2 is a transversal cross-sectional diagram of a particulate filter in which the invention is used.

Figure 1:
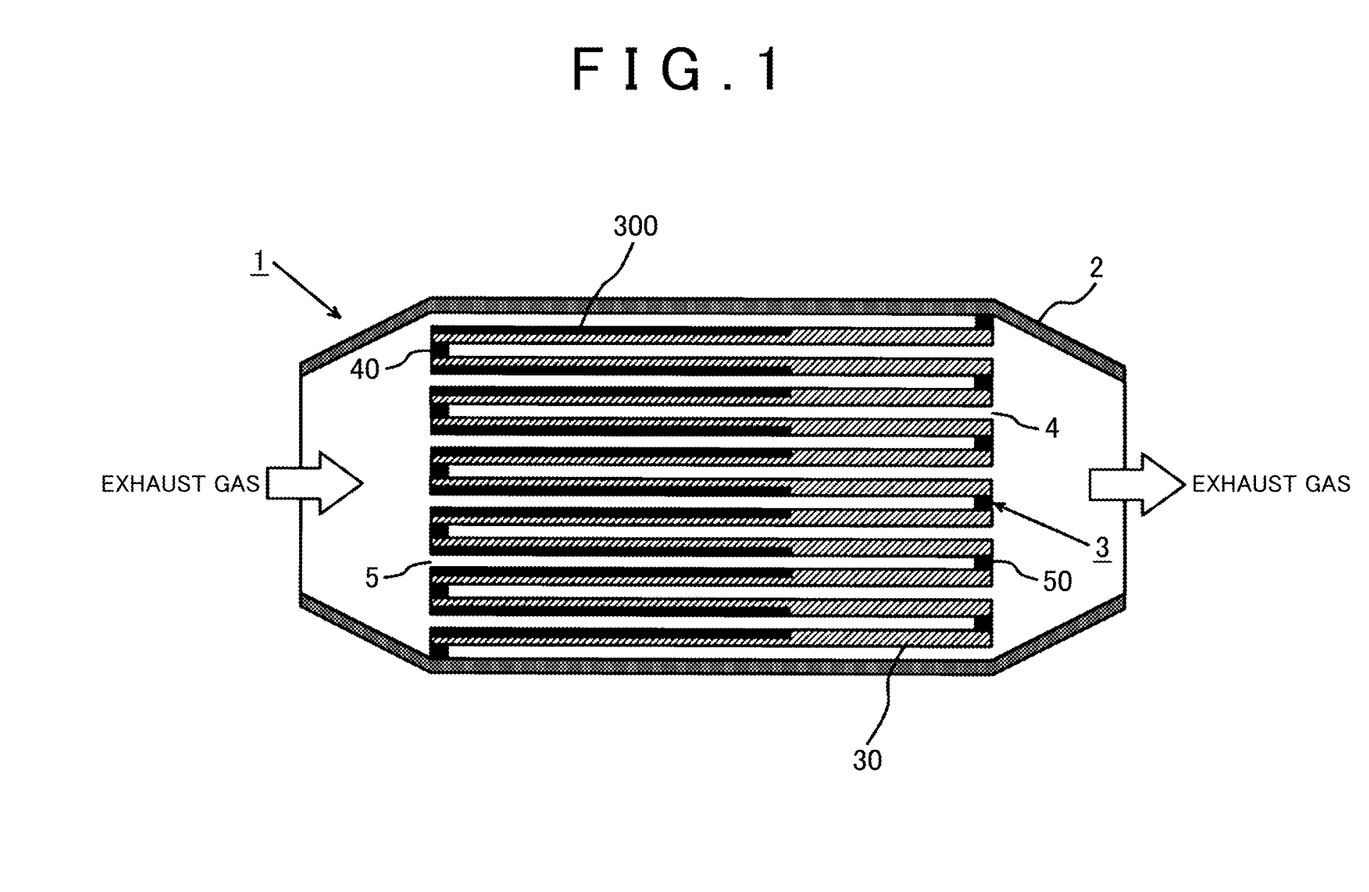
FIG. 1 is a longitudinal cross-sectional diagram illustrating a schematic configuration of a particulate filter in which the invention is used.
Figure 2:
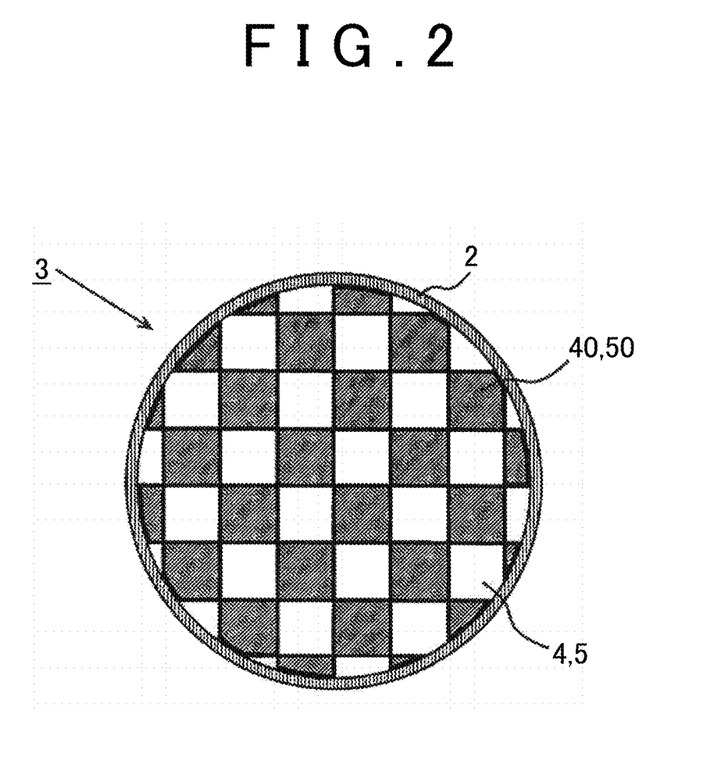
FIG. 2 is a transversal cross-sectional diagram illustrating a schematic configuration of a particulate filter in which the invention is used.

A particulate filter 1 illustrated in FIGS. 1 and 2 is disposed in an exhaust gas passage of an internal combustion engine, and traps PM that is present in the exhaust gas of the internal combustion engine. A columnar base material 3 is provided in the interior of a cylindrical case 2 of the particulate filter 1.

A plurality of passages 4, 5 that extend in the axial direction (direction of flow of the exhaust gas) is formed in the base material 3. These plurality of passages 4, 5 are disposed in the form of a honeycomb. In other words, the base material 3 is formed in such a way so as to define the plurality of passages 4, 5 that are disposed in the form of a honeycomb. The number of the passages 4, 5 illustrated in FIGS. 1 and 2 is merely exemplary, and may be established, as needed, in accordance with the specifications of the vehicle or the internal combustion engine.

Among the plurality of passages 4, 5, the upstream ends of the passages 4, in the flow direction of the exhaust gas, are blocked with plugs 40. Among the plurality of passages 4, 5, the downstream ends of the remaining passages 5, in the flow direction of the exhaust gas, are blocked with plugs 50. The passages 4 and the passages 5 are disposed alternately. Hereafter, the passages 4 will be referred to as first passages 4, and the passages 5 as second passages 5.

Sites (partition walls) 30 of the base material 3 that are positioned between the first passages 4 and the second passages 5 are formed of a porous body. Only the partition walls 30 of the base material 3 may be formed of a porous body; alternatively, the entirety of the base material 3 may be formed of a porous body. Conventional materials that are appropriate for trapping of PM in exhaust gas can be used herein as the material of the porous body. In terms of strength and heat resistance, however, a ceramic is preferably used, as represented by, for instance, silicon carbide, silicon nitride, cordierite, zirconia, titania, alumina, silica, mullite, lithium aluminum silicate, and zirconium phosphate.

The partition walls 30 are shaped in such a manner that the average pore size of the pores formed on the partition walls 30 is greater than ash and ash aggregates. Specifically, the partition walls 30 are shaped in such a manner that the average pore ranges from 25 μm to 50 μm. Herein, 25 μm is the minimum value that allows the greater part of ash and ash aggregates to slip through, and 50 μm is the minimum value of pore size that is deemed to compromise the strength and durability of the base material 3.

A porous coat layer 300 is provided on the surface of the partition walls 30 that enclose the second passages 5. The coat layer 300 is provided at a region, of the partition walls 30, from the upstream end thereof in the flow direction of the exhaust gas up to a position before the downstream end. That is, the position of the upstream end of the coat layer 300 in the flow direction of the exhaust gas coincides with that of the upstream ends of the partition walls 30, but the downstream end of the coat layer 300 is positioned further toward the front (upstream) side than the downstream ends of the partition walls 30.

As a result of diligent experimentation and verification, the inventors of the application found that upon inflow of the exhaust gas into the second passages 5, the greater part of PM in the exhaust gas flows readily into pores that are present from the upstream end of the partition walls 30 up to the front of the downstream end, while ash and ash aggregates are readily generated and are deposited in the vicinity of the downstream end of the partition walls 30. By establishing the downstream end of the coat layer 300 in the light of that finding, it becomes possible to allow the greater part of the PM to flow into the pores of the coat layer 300, and the greater part of the ash to flow into the pores of the partition walls 30 on which the coat layer 300 is not provided.

Figure 3:
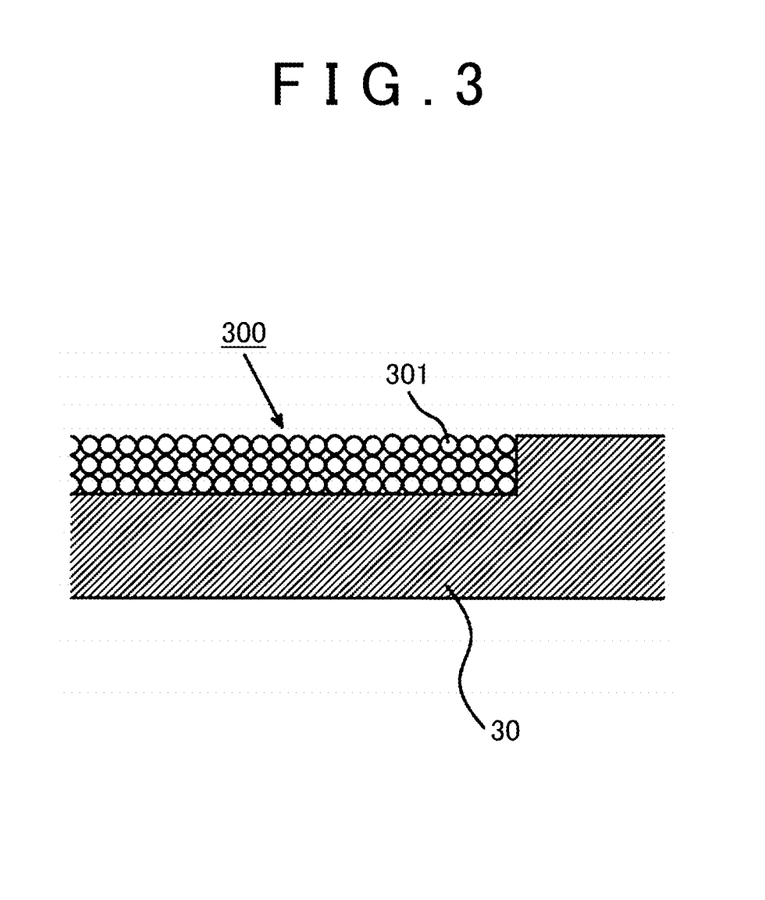
FIG. 3 is an enlarged cross-sectional diagram of partition walls on which a coat layer is provided.
Figure 4:
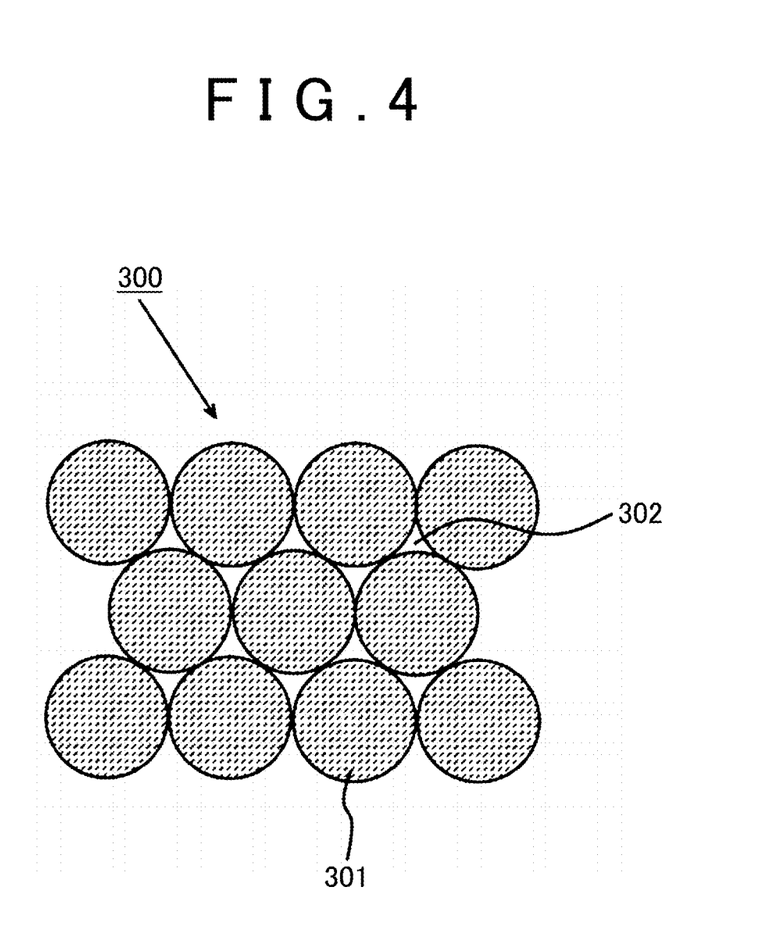
FIG. 4 is a diagram illustrating schematically the configuration of a coat layer.

For instance, the coat layer 300 is a solid-state dispersion in which substantially spherical particles 301 are homogeneously dispersed and layered, as illustrated in FIG. 3. Gaps 302 become formed between particles 301 and particles 301, as illustrated in FIG. 4 in a case where the coat layer 300 is composed of such a dispersion. These gaps 302 function as pores for trapping PM.

Particles of a ceramic identical to that of the base material 3 may be used as the particles 301 that make up the dispersion, but preferably there are used particles of a metal (for instance, a metal of the Pt group) having oxidizing ability. When the dispersion is made of metal particles of the Pt group, the PM trapped in the gaps 302 is quickly oxidized and removed in a case where high-temperature exhaust gas, or exhaust gas having an unburned fuel component, flows into the particulate filter 1.

Figure 5:
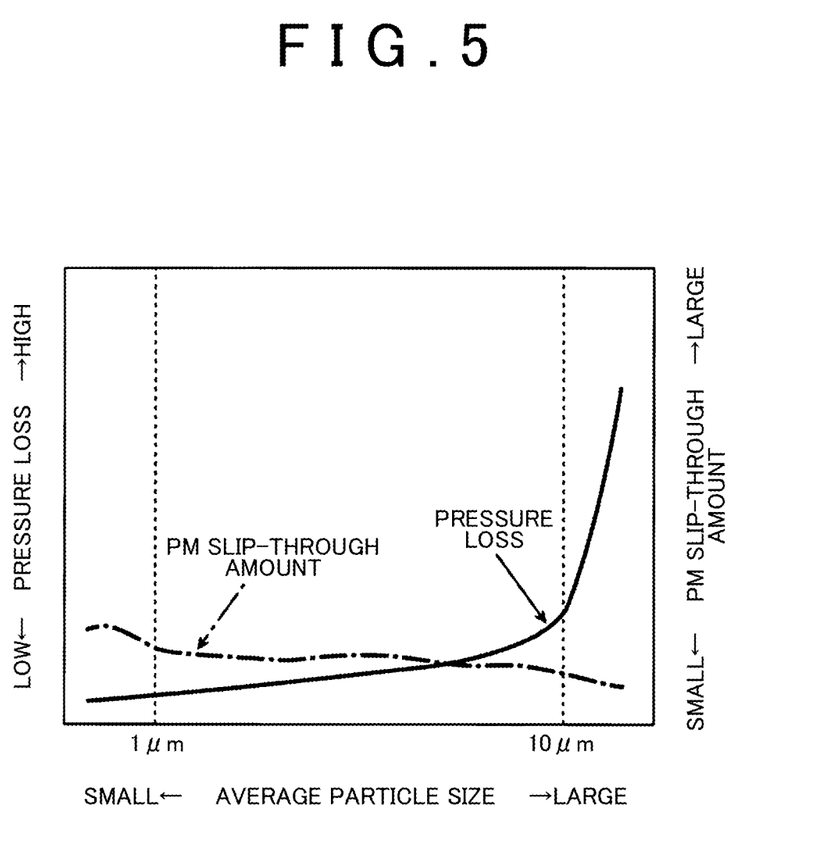
FIG. 5 is a diagram illustrating a relationship between the average particle size of particles that make up a coat layer, pressure loss of a particulate filter, and the amount of PM that slips through the particulate filter.

The average particle size of the particles 301 that make up the dispersion ranges preferably from 1 μm to 10 μm. That is because the amount of PM that slips through the particulate filter 1 is large in a case where the average particle size of the particles is smaller than 1 μm, while the pressure loss in the particulate filter 1 is greater in a case where the average particle size is greater than 10 μm, as illustrated in FIG. 5. Therefore, PM can be trapped, while suppressing increases in pressure loss, when the coat layer (dispersion) is made up of particles having an average particle size ranging from 1 μm to 10 μm.

Figure 6:
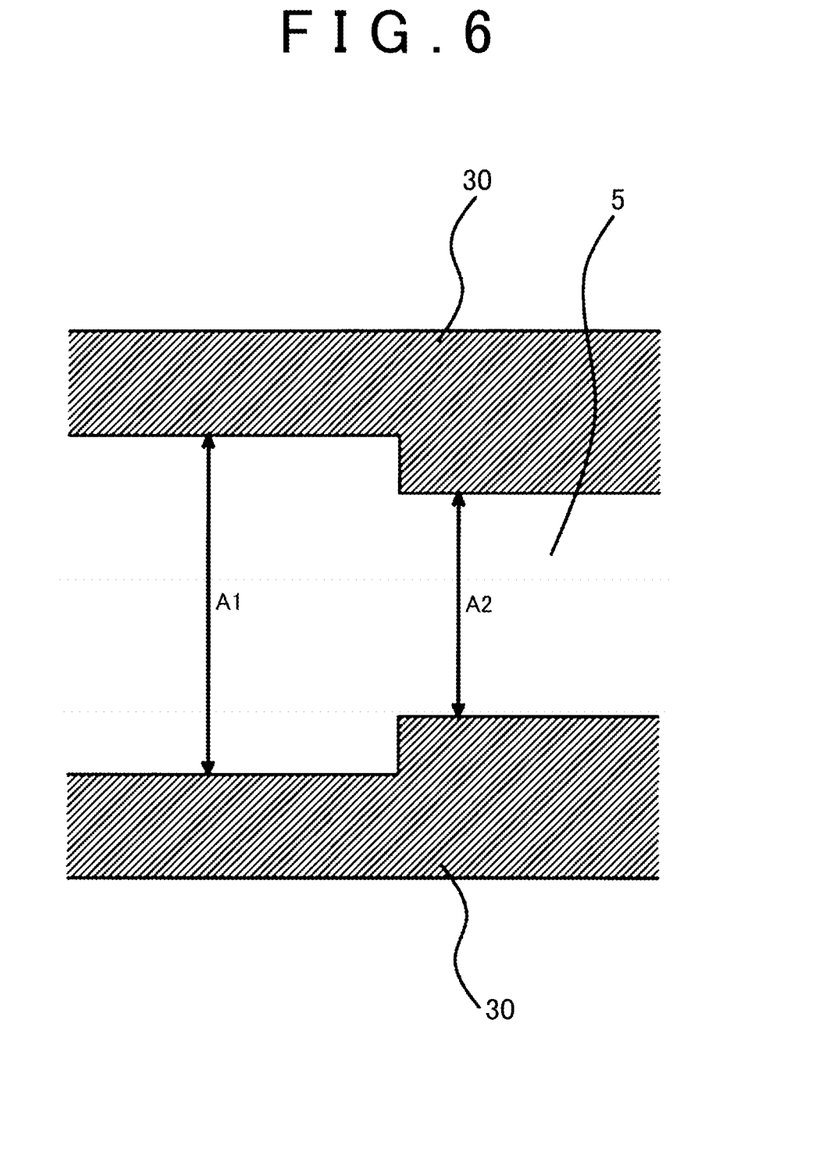
FIG. 6 is a diagram illustrating the configuration of partition walls that enclose a second passage.

Preferably, the passage cross-sectional area of the portion of the second passages 5 at which the coat layer 300 is provided is equal to the passage cross-sectional area of the portion at which the coat layer 300 is not provided. Accordingly, the thickness of the sites at which the coat layer 300 is provided may be smaller than the thickness of the sites at which the coat layer 300 is not provided, on the partition walls 30 that enclose the second passages 5, as illustrated in FIG. 3 described above. In other words, a diameter A1 of the second passages 5 at a portion where the coat layer 300 is to be provided may be set to be greater, in a state where the coat layer 300 is not provided on the second passages 5, than a diameter A2 of the second passages 5 at a portion where the coat layer 300 is not to be provided, as illustrated in FIG. 6.

The method for forming the coat layer 300 is not particularly limited, but, as an example, a method can be resorted to that involves coating the surface of the partition walls 30 with a slurry that includes metal particles of the Pt group, followed by drying and firing. In this case, it suffices that the average particle size of the metal particles (primary particles) be smaller than that of the particles 301 (secondary particles) after formation of the coat layer 300, and that the average particle size of the secondary particles lie in a range from 1 µm to 10 µm.

The average particle size of the primary particles in the slurry is smaller than the average pore size of the partition walls 30 when the average pore size of the partition walls 30 is set to range from 25 µm to 50 µm and the average particle size of the particles 301 is set to range from 1 µm to 10 µm. Accordingly, primary particles may in some instances intrude into the pores of the partition walls 30 when the partition walls 30 are coated with the slurry. When drying and/or firing is performed in a state where primary particles have intruded into the pores of the partition walls 30, the pore size of the partition walls 30 may decrease, and the pores of the partition walls 30 may become blocked. The pressure loss in the particulate filter 1 may increase unnecessarily in such a case.

Therefore, the coat layer 300 is preferably formed by resorting to a method that involves applying the slurry after the pores of the partition walls 30 have been filled with a substance that burns off in a drying process or a firing process, a method that involves hydrophobizing the partition walls 30, and using a liquid that has water or a water-soluble organic matter as a medium liquid of the slurry, or a method that involves causing a volatile solvent to be held in the pores of the partition walls 30, and applying thereafter the slurry having the volatile solvent as a main dispersion medium.

In the particulate filter 1 configured as described above, the exhaust gas that flows into the particulate filter 1 flows firstly into the second passages 5. The exhaust gas that has flowed into the second passages 5 flows then into the first passages 4 via the gaps 302 of the coat layer 300 and the pores of the partition walls 30. At that time, most of the PM in the exhaust gas becomes trapped in the coat layer 300. The ash in the exhaust gas and the ash that is formed in the second passages 5 flow into the first passages 4 via the pores of the region (region in the vicinity of the downstream end) of the partition walls 30 at which the coat layer 300 is not provided. The exhaust gas and ash that have flowed into the first passages 4 are discharged downstream of the particulate filter 1, through the openings at the downstream ends of the first passages 4.

Therefore, it becomes possible to suppress deposition of ash in the particulate filter 1 while curtailing drops in the PM trapping rate of the particulate filter 1.

Working Example 2

A second working example of the invention will be explained next on the basis of FIG. 7 to FIG. 8. Features that are different from those of the first working example described above will be explained herein, while explanation of identical features will be omitted.

The first working example described above and the working example differ in that now the coat layer 300 has a metal the ionization tendency is greater than that of Ca. As explained in the first working example, ash is generated and becomes deposited readily on the partition walls 30 in the vicinity of the downstream ends of the second passages 5, i.e. at the portions of the partition walls 30 at which the coat layer 300 is not provided. In some instances, however, a small amount of ash may be generated at the partition walls 30 in the vicinity of the upstream ends of the second passages 5 i.e. at portions where the coat layer 300 is provided on the partition walls 30. Accordingly, ash may become deposited on the coat layer 300, and the gaps 302 of the coat layer 300 may become blocked, when the usage time of the particulate filter 1 is prolonged.

When the coat layer 300 has a metal, the ionization tendency of which, is greater than that of the main component of the ash, by contrast, other components in the exhaust gas are adsorbed to or taken up into the coat layer 300 in preference to that main component. As a result, the main component of the ash does not bond readily to other components in the exhaust gas at the surface of the coat layer 300. That is, generation of ash at, the surface of the coat layer 300 is suppressed.

For instance, Ca is herein deemed to be the main component of the ash. Ca bonds with S, P or oxygen ($O_2$) in the exhaust gas, to generate ash (for instance, $CaSO_4$ or $Ca_3(PO_4)_2$.

When the coat layer 300 includes a metal such as K, Ba or the like having a greater ionization tendency than that of Ca, then, S, P or the like in the exhaust gas bond to K or Ba in preference to Ca. As a result, ash such as $CaSO_4$ or $Ca_3(PO_4)_2$ is not generated readily at the surface of the coat layer 300.

Figure 7:
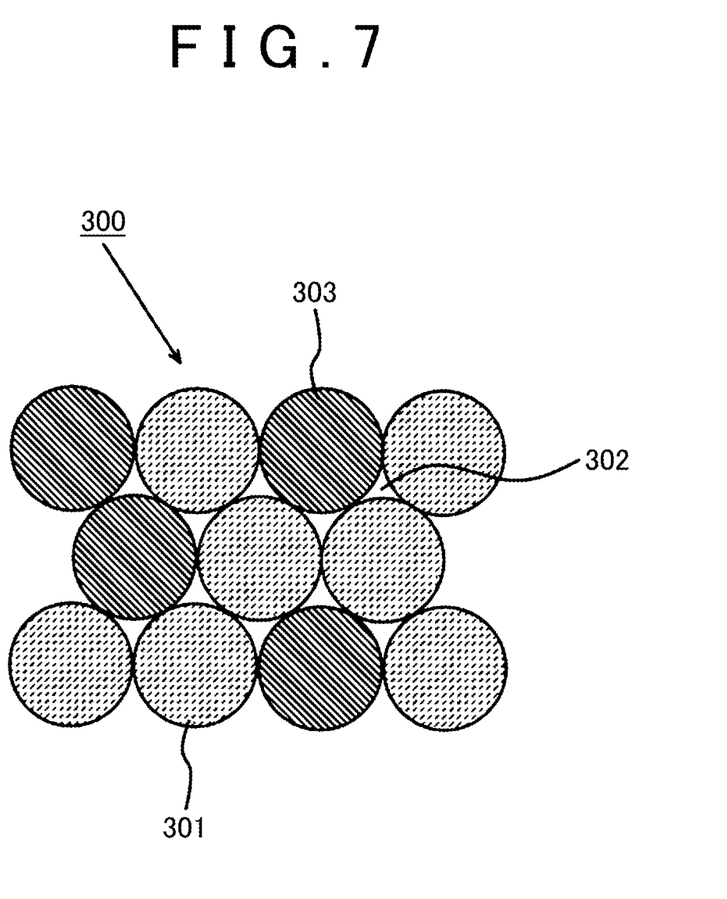
FIG. 7 is a diagram illustrating schematically the configuration of a coat layer in a second working example.
Figure 8:
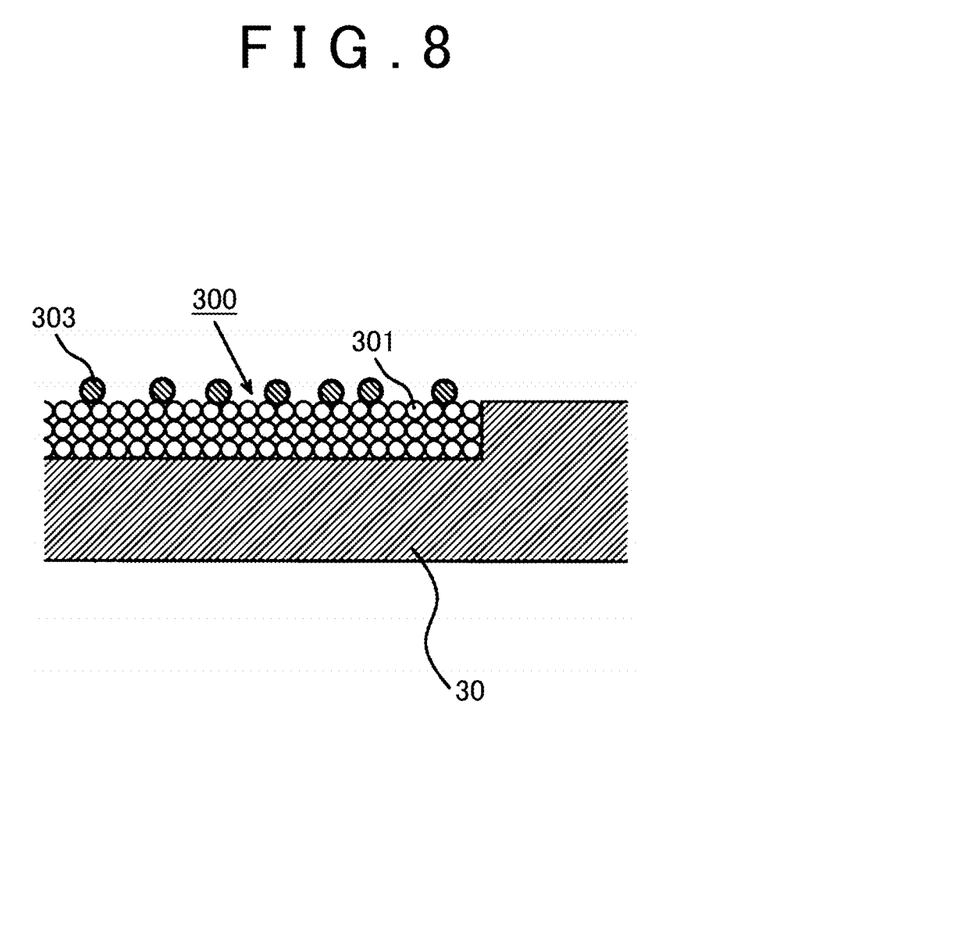
FIG. 8 is a diagram illustrating another configuration example of the coat layer in the second working example.

A method for incorporating K or Ba into the coat layer 300 may involve for instance mixing, into the particles 301 that make up the coat layer 300, particles 303 of K or Ba having an average particle size identical to that of the particles 301, as illustrated in FIG. 7. Particles 303 of K or Ba may be caused to be supported on the surface of the coat layer 300, as illustrated in FIG. 8.

The working example as described above allows suppressing yet more reliably generation and deposition of ash at the coat layer 300. As a result, the PM trapping capability of the coat layer 300 can be maintained over long periods of time.

In the working example, an instance has been explained in which the coat layer 300 has a metal, the ionization tendency of which, is greater than that of Ca, but the coat layer 300 may be set to have a metal, the ionization tendency of which, is greater than that of magnesium (Mg); alternatively, the coat layer 300 may be set to have both a metal, the ionization tendency of which, is greater than that of Ca and a metal, the ionization tendency of which, is greater than that of Mg.

Working Example 3

A third working example of the invention will be explained next on the basis of FIG. 9 to FIG. 10. Features that are different from those of the first working example described above will be explained herein, while explanation of identical features will be omitted.

The first working example described above and the working example differ in that herein a metal having oxidizing ability is supported at those regions, of the partition walls 30 that enclose the second passages 5, where the coat layer 300 is not provided. The greater part of the PM that flows into the particulate filter 1 (second passages 5) is trapped in the pores of the coat layer 300 at the region that extends from the upstream end up to the front of the downstream ends of the second passages 5. However, a small amount of PM may reach the partition walls 30 in the vicinity of the downstream ends of the second passages 5 (i.e. the portions of the partition walls 30 at which the coat layer 300 is not provided). In this case, a small amount of PM may slip through the pores of the partition walls 30 and flow out of the particulate filter 1.

When, by contrast, a metal having oxidizing ability is supported on the partition walls 30 in the vicinity of the downstream ends of the second passages 5 (i.e. at the portions of the partition walls 30 at which the coat layer 300 is not provided), the PM that reaches the vicinity of the downstream ends of the second passages 5 comes into contact with the metal, and is oxidized. As a result, it becomes possible to keep the amount of PM that slips through the particulate filter 1 yet smaller.

Figure 9:
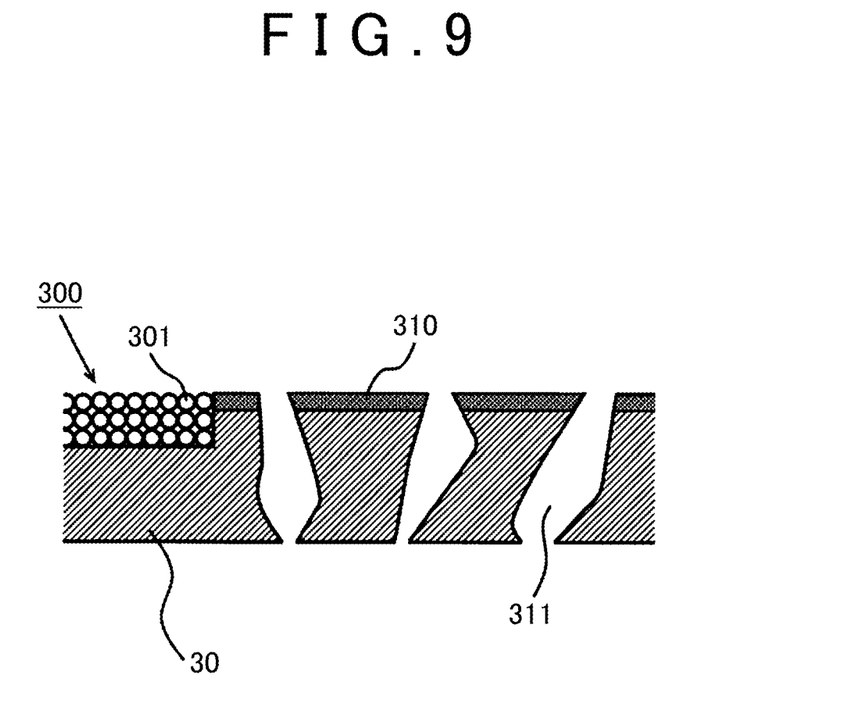
FIG. 9 is a diagram illustrating schematically the configuration of partition walls, in a third working example, at a portion at which a coat layer is not provided.
Figure 10:
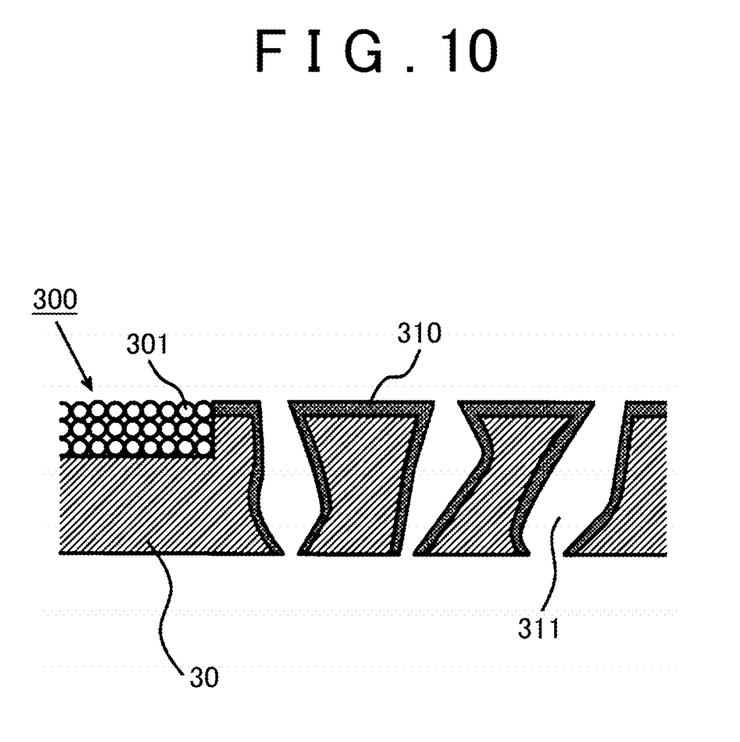
FIG. 10 is a diagram illustrating schematically another configuration of partition walls, in a third working example, at a portion at which a coat layer is not provided.

Methods that can be resorted to for causing the metal having oxidizing ability to be supported at a region of the partition walls 30 at which the coat layer 300 is not provided may involve, for instance, providing a coat layer that has metal particles of the Pt group, typified by Pt (hereafter referred to as "catalyst coat layer") 310 on the surface of the partition walls 30, as illustrated in FIG. 9. A method may also be resorted to wherein a catalyst coat layer 310 is provided also on the inner wall surface of pores 311 of the partition walls 30, in addition to on the surface of the partition walls 30, as illustrated in FIG. 10. In this case, the average pore size of the partition walls 30 and the thickness of the catalyst coat layer 310 are established in such a manner that the average pore size after the catalyst coat layer 310 has been provided ranges from 25 µm to 50 µm. The catalyst coat layer 310 described in the working example may be provided only on the partition walls 30 at the portion where the coat layer 300 is not provided, or may be provided over the entirety of the partition walls 30.

In the working example described above, the PM that is not trapped in the coat layer 300, from among the PM that flows into the particulate filter 1 (i.e. the PM that flows into the second passages 5), is oxidized at the partition walls 30 in the vicinity of the downstream ends of the second passages 5. As a result, it becomes possible to keep down the amount of PM that slips through the particulate filter 1 yet smaller.

The above-described second working example and third working example can be combined. Specifically, a metal having a greater ionization tendency than that of the main component of the ash may be incorporated into the coat layer 300, and a metal having oxidizing ability may be caused to be supported on the partition walls 30, at a region at which the coat layer 300 is not provided. In this case, generation and deposition of ash at the coat layer 300 can be suppressed yet more reliably while suppressing slipping of PM through the partition walls 30 at portions where the coat layer 300 is not provided.

Figure 11:
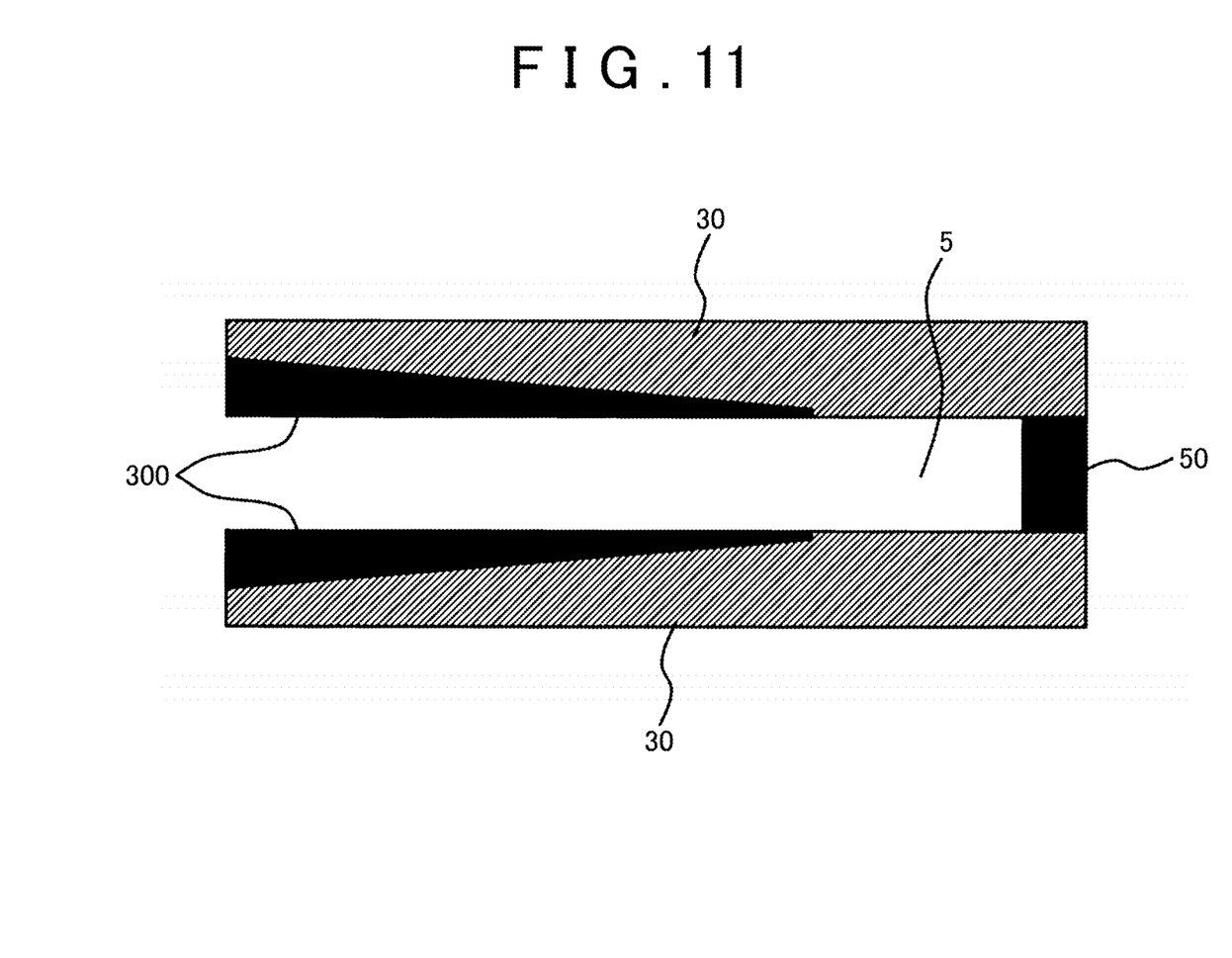
FIG. 11 is a diagram illustrating another configuration example of a coat layer.

In the above-described first through third working examples, instances have been explained wherein the thickness of the coat layer 300 is substantially constant in the flow direction of the exhaust gas, but the thickness upstream may be set to be greater than the thickness downstream. For instance, the thickness of the coat layer 300 may be set to decrease gradually from the upstream side towards the downstream side, as illustrated in FIG. 11.

The PM in the exhaust gas is trapped more readily at sites, in the coat layer 300, that lie close to the upstream end than at sites distant therefrom. Accordingly, most of the PM in the exhaust gas can be trapped even if the thickness of the coat layer 300 decreases from the upstream side towards the downstream side. Further, pressure loss is smaller when the thickness of the coat layer 300 on the downstream side is smaller. It becomes thus possible to keep to a minimum increases in pressure loss caused by coat layer 300.

In the above-described first through third working examples, instances have been explained wherein the coat layer 300 is provided only on the partition walls 30 that enclose the second passages 5, but the coat layer 300 may be provided also on the partition walls 30 that enclose the first passages 4. However, pressure loss in the particulate filter 1 may increase significantly when the coat layer 300 is provided on both the partition walls 30 that enclose the second passages 5 and the partition walls 30 that enclose the first passages 4. Accordingly, the coat layer 300 may be provided at both partition walls 30, so long as the pressure loss in the particulate filter 1 lies within an allowable range.

1 particulate filter
2 case
3 base material
4 first passages
5 second passage
30 partition wall
40 plug
50 plug
300 coat layer
301 particle
302 gap
303 particle
310 catalyst coat layer
311 pore

The invention claimed is:

1. A particulate filter, comprising:
a plurality of first passages, the ends of the first passages being blocked on an upstream-side in a flow direction of exhaust gas;
a plurality of second passages, the ends of the second passages being blocked on a downstream side in the flow direction of exhaust gas;
porous partition walls that are members that separate the first passages from the second passages, the porous partition walls having pores of a size such that ash passes through the pores; and
a porous coat layer provided at part of a region of the partition walls from an upstream end of the partition walls up to a position before a downstream end of the partition walls, the porous coat layer having pores smaller than the pores of the partition walls, and a thickness of the porous coat layer decreasing gradually from the end of the upstream side of the porous coat layer towards the downstream side of the porous coat layer.

2. The particulate filter according to claim 1, wherein a catalyst having oxidizing ability is supported at a region of the partition walls at which the porous coat layer is not provided.

3. The particulate filter according to claim 1, wherein the pores of the porous partition walls have an average pore size that ranges from 25 µm to 50 µm.

4. The particulate filter according to claim 1, wherein the porous coat layer is a dispersion, the dispersion being made up of particles having an average particle size ranging from 1 µm to 10 µm.

5. The particulate filter according to claim 1, wherein the porous coat layer comprises a metal, the ionization tendency of which is greater than that of a main component of the ash.

* * * * *